US009735470B2

(12) United States Patent
Pike (10) Patent No.: US 9,735,470 B2
(45) Date of Patent: Aug. 15, 2017

(54) MULTIBAND DATA SIGNAL RECEIVING AND/OR TRANSMITTING APPARATUS (71) Applicant: Pro Brand International (Europe) Limited, Haslingden (GB)

(72) Inventor: Matthew James Pike, Radcliffe (GB)

(73) Assignee: Pro Brand International (Europe) Limited, Haslingden (GB)

( * ) Notice: Subject to any disclaimer, the term of this patent is extended or adjusted under 35 U.S.C. 154(b) by 43 days.

(21) Appl. No.: 14/379,364

(22) PCT Filed: Feb. 18, 2013

(86) PCT No.: PCT/GB2013/050377
§ 371 (c)(1),
(2) Date: Aug. 18, 2014

(87) PCT Pub. No.: WO2013/121221
PCT Pub. Date: Aug. 22, 2013

(65) Prior Publication Data
US 2015/0024698 A1    Jan. 22, 2015

(30) Foreign Application Priority Data

Feb. 17, 2012  (GB) .................................. 1202716.5
Jul. 24, 2012  (GB) .................................. 1213141.3

(51) Int. Cl.
*H01Q 15/24*    (2006.01)
*H04B 1/40*    (2015.01)
(Continued)

(52) U.S. Cl.
CPC ........... *H01Q 5/0096* (2013.01); *H01P 1/161* (2013.01); *H01P 1/171* (2013.01); *H01Q 5/55* (2015.01);
(Continued)

(58) Field of Classification Search
CPC ........ H01P 1/171; H01P 1/2131; H01P 1/122; H01Q 13/02; H01Q 15/242; H01Q 5/0096; H04B 1/40
See application file for complete search history.

(56) References Cited

U.S. PATENT DOCUMENTS 2,423,130 A    7/1947  Tyrrell
2,905,908 A    9/1959  Holzschuh et al.
(Continued)

FOREIGN PATENT DOCUMENTS

DE    3111106    12/1987
DE    4034683    8/1993
EP    0014692    8/1980

OTHER PUBLICATIONS

English Translation of DE3111106—Pub Date Dec. 3, 1987—Siemens Ag.
(Continued)

*Primary Examiner* — Lewis West
(74) *Attorney, Agent, or Firm* — Woodard, Emhardt, Moriarty, McNett & Henry LLP (57) ABSTRACT

Apparatus is provided to allow the reception and/or transmission of data signals at two different frequency bands. The apparatus includes a waveguide (4) which has a first section (6) of larger cross sectional area for receiving and/or transmitting the lower frequency band signals, and a reducing section (8) which leads to a section with a reduced cross sectional area in comparison to the first section (6) and this allows the receipt of the higher frequency band signals. In one embodiment sections of the waveguide can be rotated to allow the apparatus to be adjusted to any particular orientation to suit the particular circular polarity transmission type at the location at which the apparatus is provided at that time.

29 Claims, 9 Drawing Sheets (51) Int. Cl.
*H01Q 13/02* (2006.01)
*H01P 1/161* (2006.01)
*H01P 1/17* (2006.01)
*H01Q 5/00* (2015.01)
*H01Q 5/55* (2015.01)

(52) U.S. Cl.
CPC ........... *H01Q 13/02* (2013.01); *H01Q 15/242* (2013.01); *H04B 1/40* (2013.01)

(56) References Cited

U.S. PATENT DOCUMENTS

| | | | |
|---|---|---|---|
| 2,942,208 A | | 6/1960 | Lapidus et al. |
| 2,999,153 A | * | 9/1961 | Neumann ............... H01P 1/122 200/61.58 R |
| 3,955,202 A | | 5/1976 | Young |
| 4,047,128 A | * | 9/1977 | Morz .................... H01P 1/2131 333/122 |
| 4,546,471 A | | 10/1985 | Bui-Hai |
| 5,175,516 A | * | 12/1992 | Walsh ..................... H01P 1/264 333/22 F |
| 5,784,033 A | * | 7/1998 | Boldissar, Jr. ........ H01P 1/2131 333/113 |
| 6,041,219 A | * | 3/2000 | Peterson ............... H01P 1/2131 333/242 |
| 6,154,181 A | | 11/2000 | Hu-Guo et al. |
| 6,166,699 A | | 12/2000 | Khammouni et al. |
| 6,323,819 B1 | * | 11/2001 | Ergene ................... H01P 1/161 333/134 |
| 6,621,375 B2 | * | 9/2003 | Vezmar ................. H01P 1/2131 333/125 |

OTHER PUBLICATIONS

English Translation of DE4034683—Pub Date Aug. 12, 1993—Spinner GmbH.

* cited by examiner

MULTIBAND DATA SIGNAL RECEIVING AND/OR TRANSMITTING APPARATUS

REFERENCE TO RELATED APPLICATIONS

This application is the U.S. national stage application of International Patent Application No. PCT/GB2013/050377, filed Feb. 18, 2013, which claims priority of Great Britain Application No. 1202716.5, filed Feb. 17, 2012, and which claims priority of Great Britain Application No. 1213141.3, filed Jul. 24, 2012, the disclosures of each of which are incorporated herein by reference in their entirety.

The invention to which this application relates is apparatus which is provided to allow the reception and/or transmission of radio frequency (RF) data signals which are transmitted from one or more broadcast locations to a number of receiving locations via one or more transmission system apparatus such as one or more satellites. Typically, the apparatus at each of the locations includes an antenna and Low Noise Block (LNB) for receiving and, if required, a Block Up converter (BUC) for transmitting, which allow the data signals to be received and passed to processing apparatus which allows the received signals to be further processed into a format for use in the generation, typically, of video and/or audio data and/or internet data and when provided, a means for data to be transmitted from the location. The invention is particularly related to the means which allow the transition between a waveguide or feed provided in connection with the Low Noise Block and/or Block Up Converter and further processing components which are typically mounted on one or more printed circuit boards. The transition is required to be performed in order to allow the received data signals to be split into sets of different data signals having known characteristics and then routed to the appropriate processing paths and components.

There are increasing demands for more data signals to be received and processed and/or transmitted at any given location in order to allow further services to be provided to and from that location. In order to increase the data which is transmitted the same can be transmitted with different orthogonal characteristics and/or can be transmitted in different frequency bands. The increase in data means, conventionally, that there is required to be an increase in the quantity of apparatus which is required to be provided at the said location with, typically, a first set of apparatus provided to receive and/or transmit data signals in a first frequency band, a second set of apparatus provided to receive and/or transmit data signals in a second frequency band and so on. However this is expensive in terms of the amount of apparatus which is required to be provided.

A further problem which can be experienced is with regard to the processing of circular polarity data and the problem which is experienced in that typically, at the time of installation, the circular polarity receiving apparatus is provided in a configuration which suits the orientation of the signals received at that location at that time of installation. However, it is found that, in practice, there may be a need for the apparatus to be moved from the first location to a second location or for the orientation of the apparatus to be adjusted which means that the data signals transmitted to the apparatus may change in terms of orientation, at a time after installation. These requirements may mean that the configuration of the apparatus is not subsequently suitable and therefore can mean that the apparatus cannot be used at the new location or with the different signal configuration and so new apparatus would conventionally be provided.

An aim of the present invention is to provide apparatus in an improved format which allows the reception and/or transmission of data signals in multiple frequency bands and the subsequent separation of the received data into distinct data sets and the routing of the same to appropriate processing means. A further aim of the invention is to provide the apparatus in a form in which the same can be adjusted subsequently.

In a first aspect of the invention there is provided apparatus for receiving radio frequency data signals transmitted in a plurality of frequency bands, said apparatus including a waveguide which is configured to at least receive said data signals wherein said waveguide includes a passage, said passage having a section which has a reduced cross sectional area compared to a section upstream in the waveguide in order to separate the data signals received at a lower frequency band into a first set of data signals and data signals received at a higher frequency band into a second set of data signals and routing means are located on, and in communication with, the waveguide to allow the routing of said respective sets of data signals, separately, to appropriate processing means.

In one embodiment the apparatus is also used to transmit data from said receiving location.

In one embodiment the progression to the section of the waveguide with the reduced cross sectional area is achieved by providing a frustoconically and/or stepped shaped section which progressively narrows the cross sectional area of the waveguide until the required reduced cross sectional area is achieved. In one embodiment the interior surface of the section is relatively smooth walled. In another embodiment the interior surface of the said section is formed from a series of stepped rings.

Typically only the set of data signals received in the higher frequency band passes to the section of the waveguide with the reduced cross sectional area.

Typically the means for routing the set of data signals received at the lower frequency are located in the section of the waveguide with the larger cross sectional area, typically upstream of the frustoconically shaped section of the waveguide and the means for routing the set of data signals received in the higher frequency waveband are located in the section of the waveguide with the reduced cross sectional area. Typically the routing means are provided in the form of probes formed of microstrips. Typically two probes are provided for each of the sets of data signals and are typically connected to a common PCB on which are provided paths and components to allow the appropriate processing of the data signals in the set which is routed along each path. In an alternative embodiment coaxially mounted probes can be used.

In one embodiment the waveguide includes one or more polarisers. In one embodiment a stepped section is provided and formed to act as a septum polariser so as to allow the splitting of a set of data signals into two subsets, each subset including data in one of two orthogonal components. Typically, once split, the two subsets are provided to separate routing means in the same phase.

In one embodiment the first section for receiving and processing signals received at a lower frequency band and second section for receiving and processing signals at a higher frequency band are provided and said second section is split, at least at the outlet therefrom, to have an outlet for left-hand circular polarity signals and an outlet for right-hand circular polarity in a first operating orientation and a receiver and/or transmitter located at one of said outlets to receive the signals therefrom, wherein relative movement between the sections allows the selection of which of the outlets the receiver and/or transmitter receives and/or transmits signals from and/or to.

In one embodiment the said second section is rotatably adjustable so as to allow the selective positioning of one of the outlets with the said receiver and/or transmitter.

Typically, the rotation is about the longitudinal axis of the said second section.

Typically, the rotation of the second section required in order to move the same from a position at which the first outlet is located at the receiver and/or transmitter to a position at which the other outlet is located at the receiver and/or transmitter is 180°.

In one embodiment the waveguide apparatus includes a second polariser provided at a spaced location along the waveguide from the first polariser.

In one embodiment the data signals which are received are transmitted in the Ku and Ka bands with the data signals received in the Ku waveband being received in a linear form and passed to respective probes in Vertical and Horizontal data signal subsets and the data signals received in the Ka band being received in a circular polarity form and passed to respective probes having been converted via the septum polariser from right hand and left hand circular polarisation to linear modes.

In a further aspect of the invention there is therefore provided apparatus for receiving and transmitting signals via one or more pre-determined wavebands, said apparatus provided with a first section for receiving and processing signals received at a lower frequency band and a second section for receiving and processing signals at a higher frequency band, said second section split, at least at the outlet therefrom, to have an outlet for left-hand circular polarity signals and an outlet for right-hand circular polarity in a first operating orientation and a receiver and/or transmitter located at one of said outlets to receive the signals therefrom, wherein relative movement between the sections allows the selection of which of the outlets the receiver and/or transmitter receives and/or transmits signals from and/or to.

In one embodiment the said second section is rotatably adjustable so as to allow the selective positioning of one of the outlets with the said receiver and/or transmitter.

Typically, the rotation is about the longitudinal axis of the said second section.

Typically, the rotation of the second section required in order to move the same from a position at which the first outlet is located at the receiver and/or transmitter to a position at which the other outlet is located at the receiver and/or transmitter is 180°.

By providing the ability to rotate the relevant sections with regards to the remainder of the apparatus, it is possible to allow the apparatus to be adjusted to any particular orientation to suit the particular circular polarity transmission type at the location at which the apparatus is provided at that time. This therefore allows the configuration of the apparatus to be changed to suit the operating parameters at a specific location at a specific time.

Specific embodiments of the invention are now described with reference to the accompanying drawings; wherein.

Referring firstly to FIG. 1a and FIGS. 2a-c there is shown apparatus in one embodiment of the invention for receiving multiband data signals which have been transmitted in Ku frequency band in a linear polarisation and in the Ka frequency band in a circular polarisation. Furthermore the Ku frequency band is at a lower frequency than the Ka frequency band. All of the received data signals are received at the entry 2 to the waveguide 4. In this embodiment the waveguide has a first upstream section 6 which has a greater cross sectional area along its length than that of the downstream section 8. The progression between the sections 6 and 8 is achieved by the provision, in this embodiment, of a frustoconically shaped section 10 as shown. The provision of the change in cross sectional area allows the separation of the data signals which are received in the two frequency bands such that the set of data signals received at the lower frequency cannot progress along the waveguide beyond the section 6 and hence only the set of data signals received in the higher frequency band are present in the section 8.

Figure 1A:
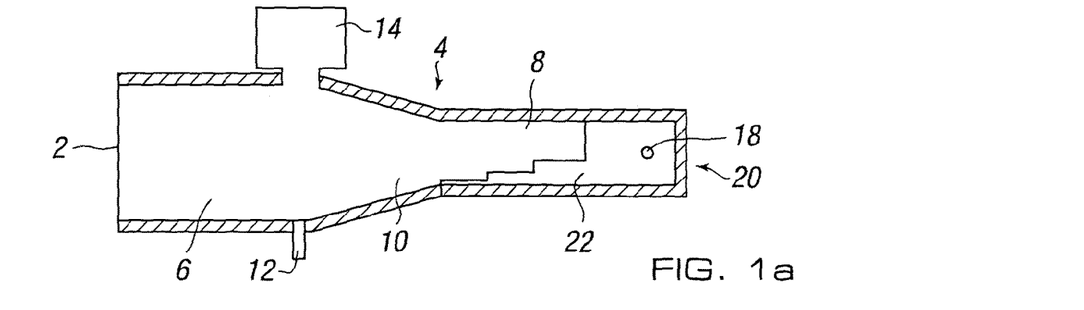
FIGS. 1a-d illustrate in a schematic manner several embodiments of the invention.
Figure 2A:
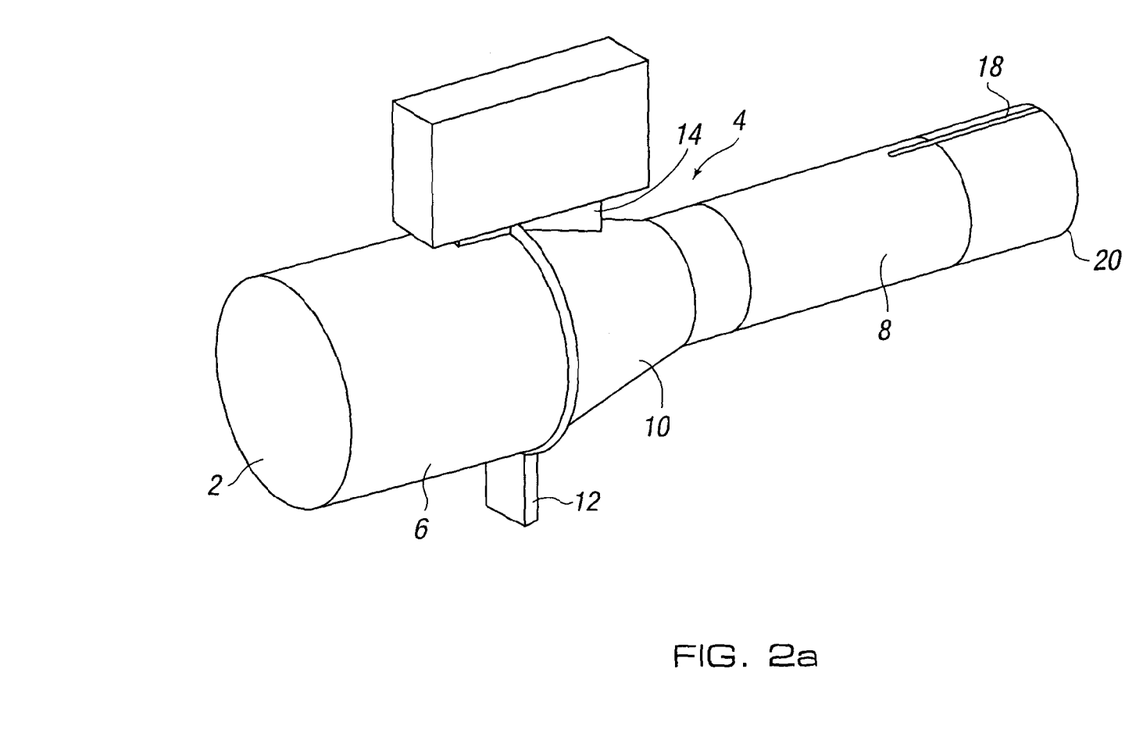
FIGS. 2a-c illustrate the embodiment of FIG. 1a in greater detail.
Figure 2B:
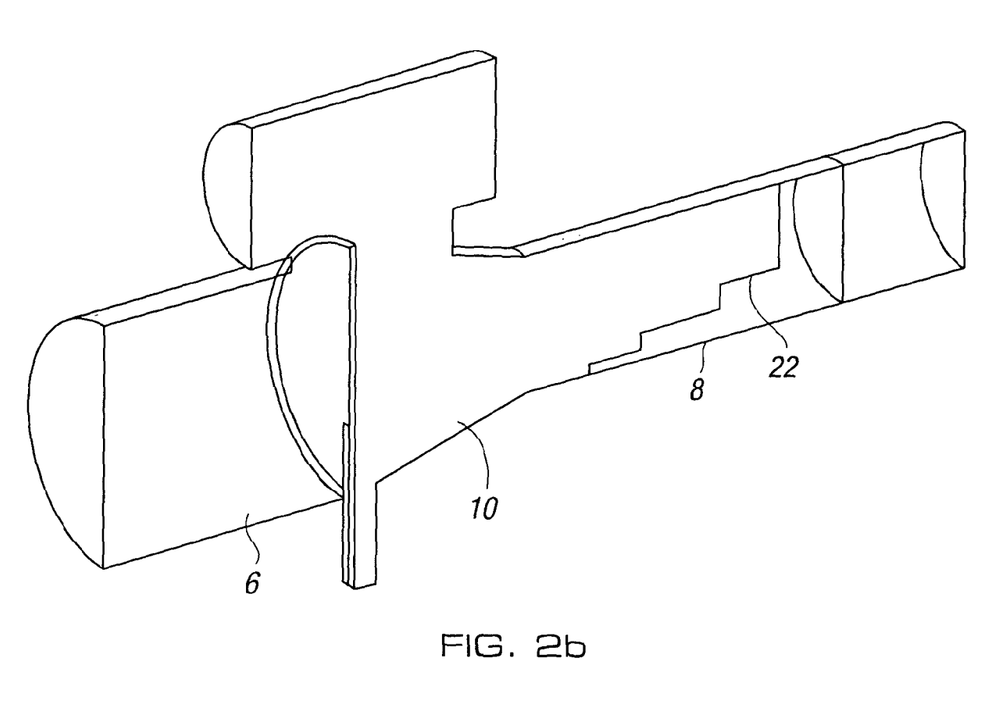
Figure 2C:
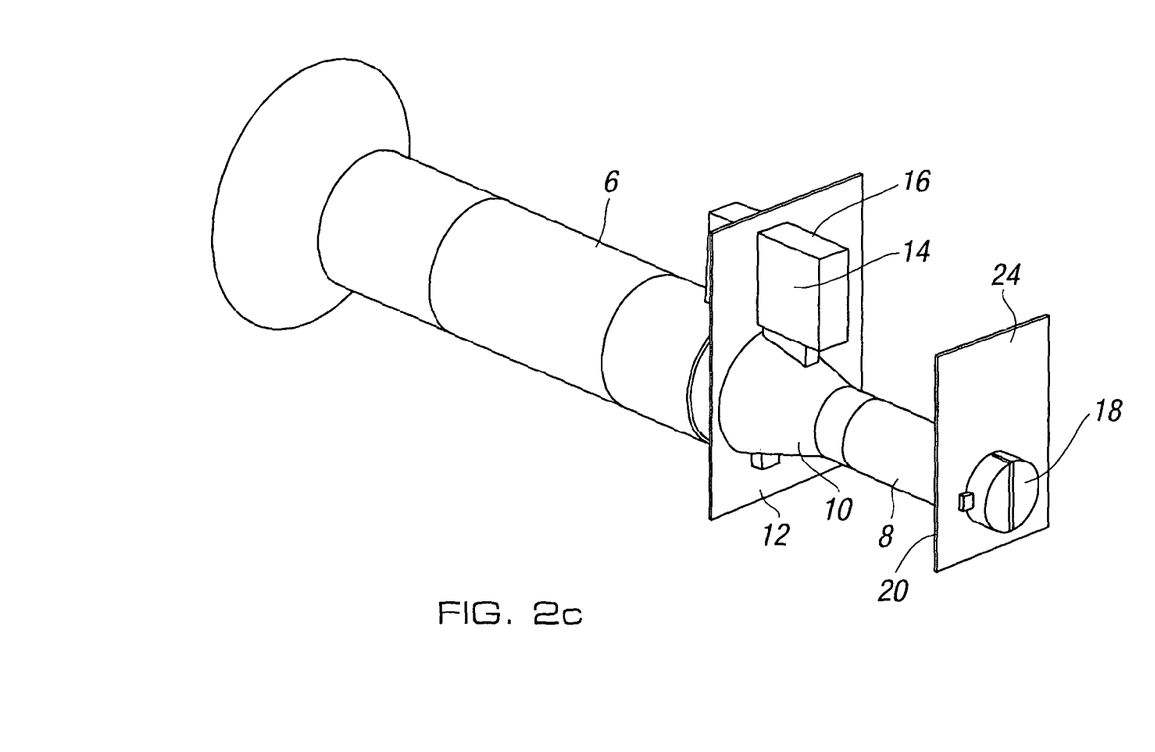

Routing means probes or microstrips 12,14 are provided at the section 10 to allow the routing of the vertical and horizontal data signal subsets of the lower frequency band from the waveguide and, via the probes, onto a printed circuit board 16 shown in FIG. 2c.

With regard to the data signal set present in the section 8 of the waveguide 4, as the data set, in this embodiment, is in a circular polarity format there is a need to convert the same into subsets of data signals with linear orthogonal characteristics respectively and maintain the same in phase as they leave the waveguide via respective routing means in the form of microstrips or probes 18, 20 one of which 18, points out of the page towards the viewer and the other, 20, is on the opposing side the waveguide and hence hidden from view in FIG. 1a. In order to achieve this a septum polariser 22 is formed along the interior of the waveguide section 8, as is shown in, for example, FIG. 1a and FIG. 2b which show the waveguide 4 in cross-section. The provision of the polariser allows the separation of the data signal set into two subsets as required and the passage of the same to the printed circuit board 24.

It should be appreciated that any suitable routing means assembly can be utilised for each of the data signals subsets, and for that reason the same are not discussed in detail herein as the current invention is concerned with the manner in which the data signal sets are made available to the appropriate routing means.

Figure 1B:
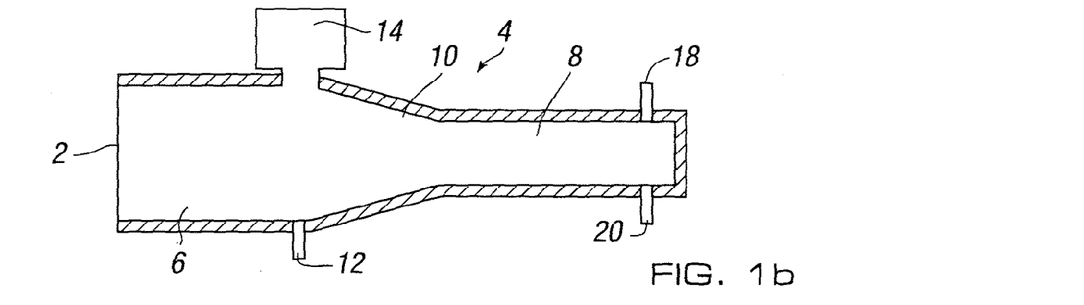
Figure 1C:
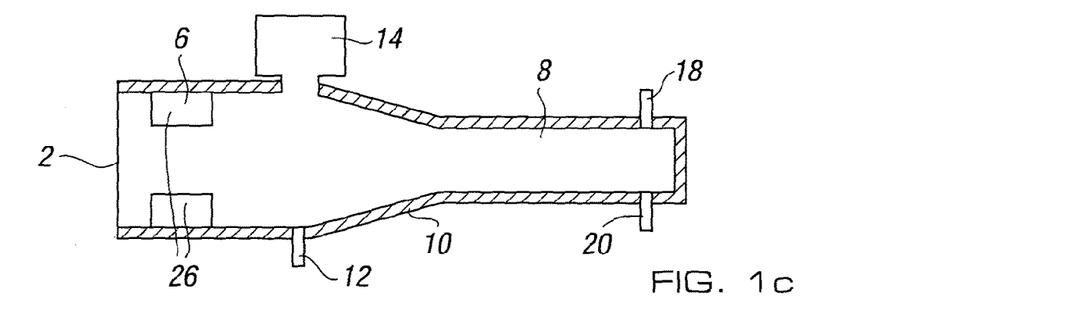
Figure 1D:
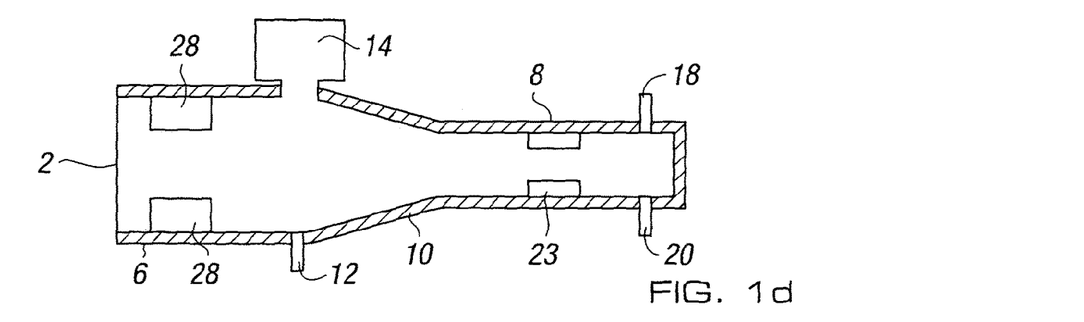

The invention can also be adapted for use in relation to the particular format of data signals which are to be received and FIGS. 1b-d illustrate alternative embodiments showing, in each case, a cross section view along the longitudinal axis of the waveguide, in a schematic manner.

FIG. 1b illustrates an arrangement which is similar to that shown in FIG. 1a but does not include a septum polariser. This embodiment can be used to receive and separate data signals which are received at higher and lower frequency bands and in which both data sets are received with a linear polarity.

FIG. 1c illustrates an embodiment in which a broadband polariser 26 is provided in the section 6 of the waveguide. No polariser is provided in the section 8 and this allows the reception and separation of data signals in a lower frequency band in a circular polarity format and data signals in a higher frequency band in a circular polarity format.

FIG. 1d illustrates a further embodiment of apparatus to receive data signals at a higher frequency band in a circular polarity format and at a lower frequency band in a circular polarity format. In this case there is provided narrowband polarisers 23 in the section 8 of the waveguide and a polariser 28 at the section 6, with the polariser allowing the splitting of the data set at the high frequency band and the data set at the lower frequency band into subsets of right hand and left hand circular polarities respectively so that the same can be passed to the appropriate probes, i.e., the data signal subsets separated by polariser 28 are passed to the probes 12 and 14 for the data set received at the lower frequency band and the data signal subsets separated by polariser 23 are passed to the probes 18 and 20 for the data received at the higher frequency band. This particular embodiment could also provide for a circular polarity format at a lower frequency band and a linear polarity format at the higher frequency band by correcting the phase of polariser 28 using the phase shift properties of polariser 23.

It should also be appreciated that in each and any of the embodiments shown, that any of the outputs from the waveguide as illustrated may include one or more further components of operation integrated therewith and in particular integrated into the transition from the waveguide to onward processing, typically via the probes at the respective outlet. In one embodiment the said waveguide and/or component and/or transition may have all or part of their waveguide structure formed from a ground plane of the PCB which is located at that outlet. The further components may be, for example, further signal filtering, and which uses the PCB ground plane as a waveguide wall.

Figure 3:
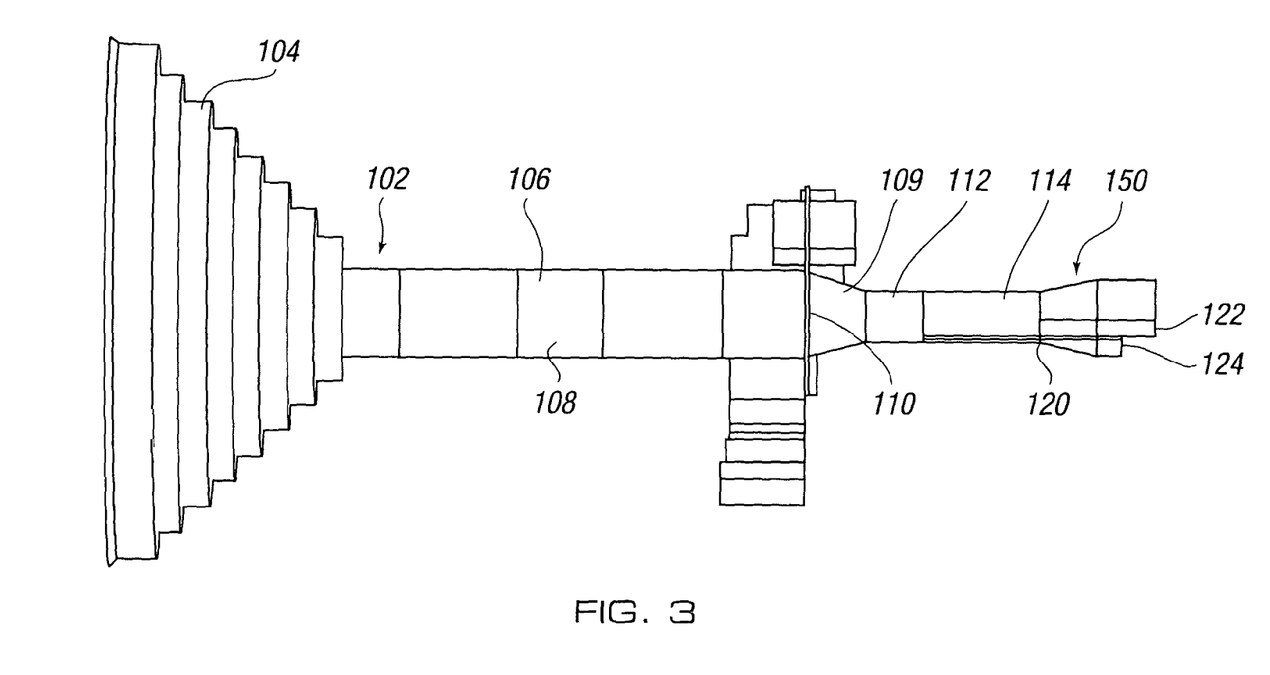
FIGS. 3 and 4 illustrate apparatus in a further embodiment of the invention.
Figure 4:
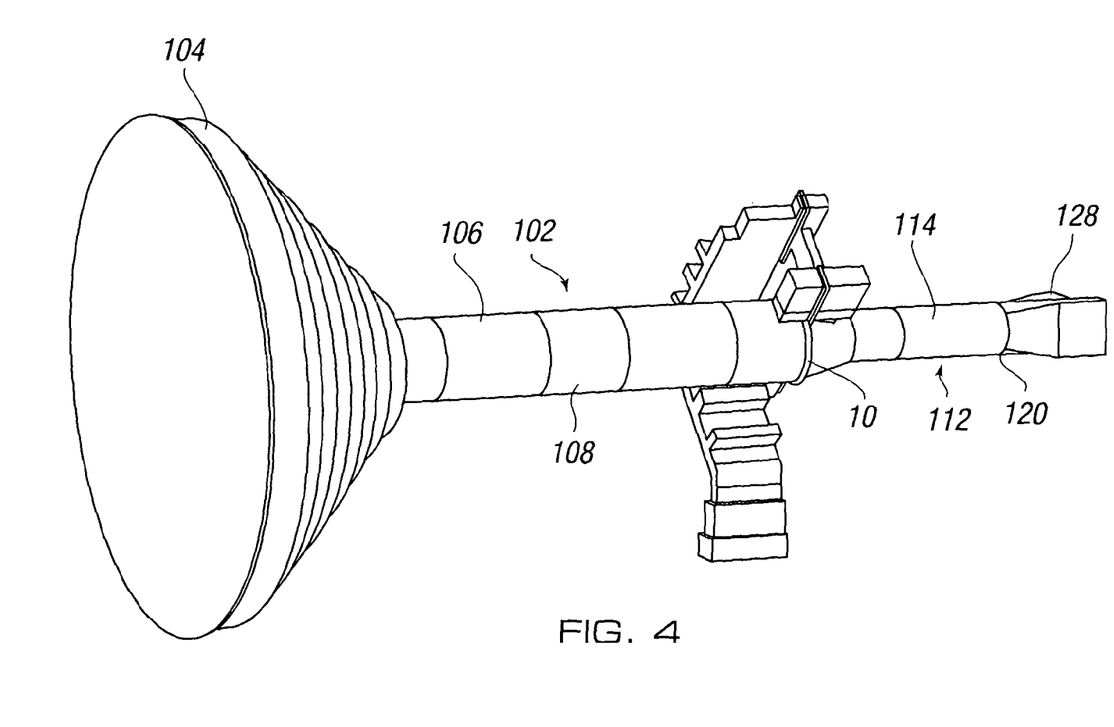

FIG. 3 illustrates a further embodiment of the apparatus in accordance with the invention in which there is provided apparatus 102 wherein the apparatus incorporates a receiving horn 104 leading to first section 106 which is provided with a circular polarity converter 108 and a reducing section 109. The converter 108 leads to processing means 110 which receives and process the lower frequency signals at the first section 106 of the apparatus. The higher frequency signals continue through the reducing section 109 to the second section 112 which, in this embodiment, includes a septum polarizer 114. Adjacent to the outlet 120 of the second section, the same is split into two outlet portions 122 and 124 as illustrated in FIGS. 5 and 6 with one of the outlet portions 122 allowing the passage of right-hand circular polarity signals and the other of the outlets 124 allowing the passage of left-hand circular polarity signals.

Typically, at any given time, only one of the left-hand or right-hand circular polarity signals will be used and a receiver and/or transmitter 126 is located adjacent to one of the outlet portions 122, 124 to receive and/or transmit one or other of the left-hand or right-hand circular polarity signals and to then allow the processing of the same. The particular outlet at which the receiver is located is dependent upon the operating parameter of the system at that location and at that time.

Figures 5, 6, 7:
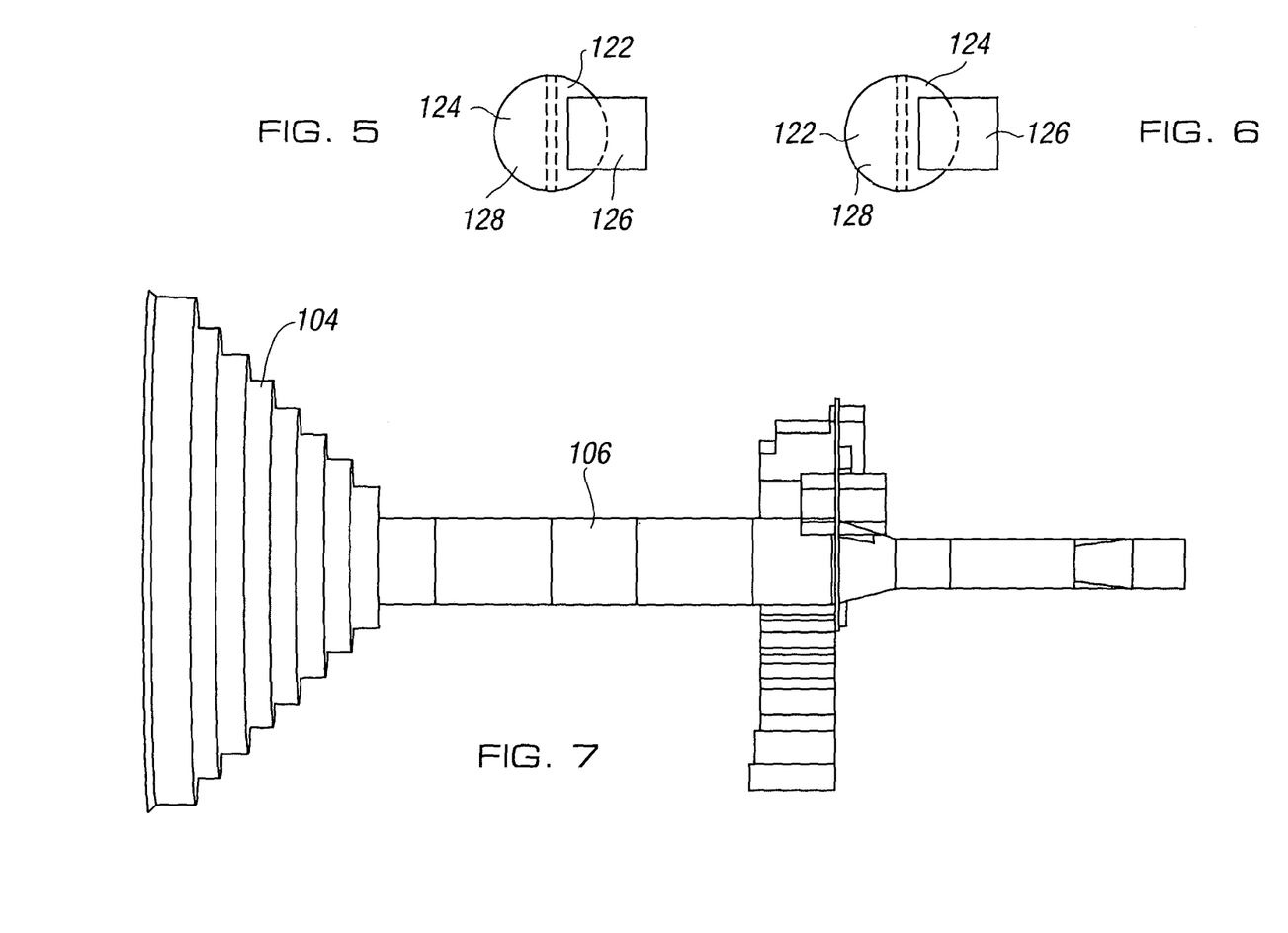
FIG. 5 illustrates an end elevation of the apparatus in FIG. 3 at the outlet of the second section, in a first orientation.
FIG. 6 illustrates the end elevation of FIG. 5 in a second orientation.
FIGS. 7-9 illustrate the fixed and movable sections of the device.

FIG. 5 illustrates the apparatus in a first configuration in which the receiver is located to receive and/or transmit and allow further processing of the right-hand circular polarity and the microwave absorber 128 is located so as to prevent the left-hand circular polarity signals from reflecting back into the device.

Figure 8:
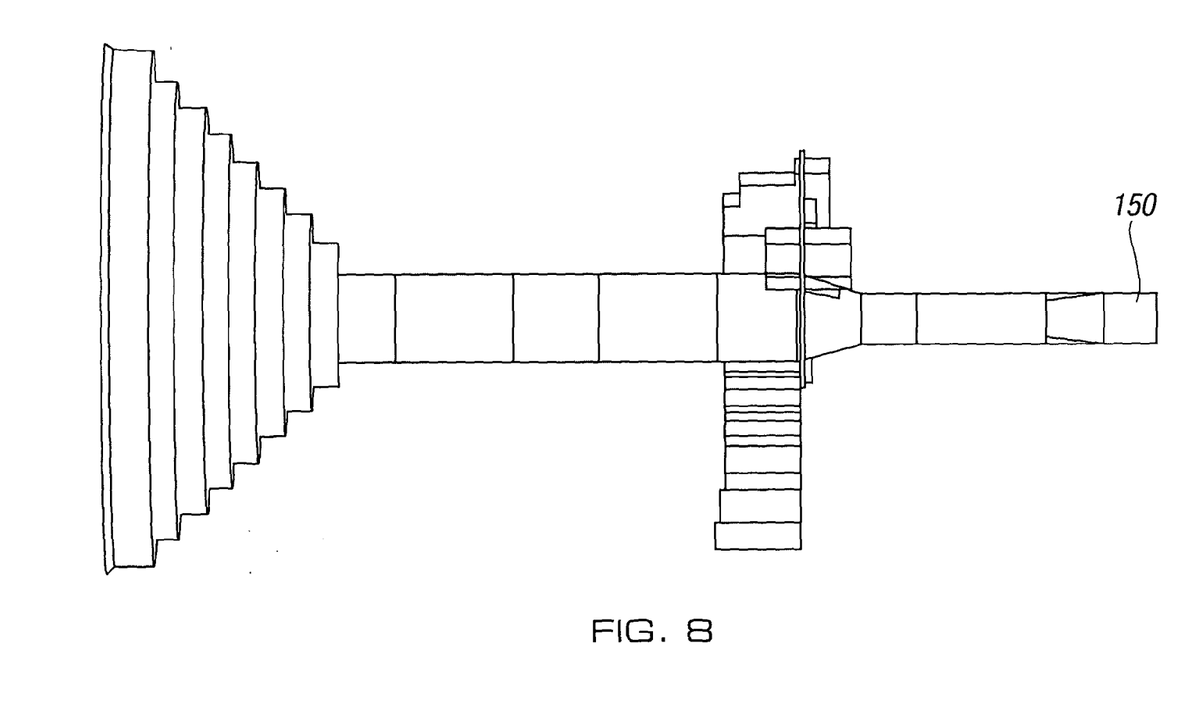
Figure 9:
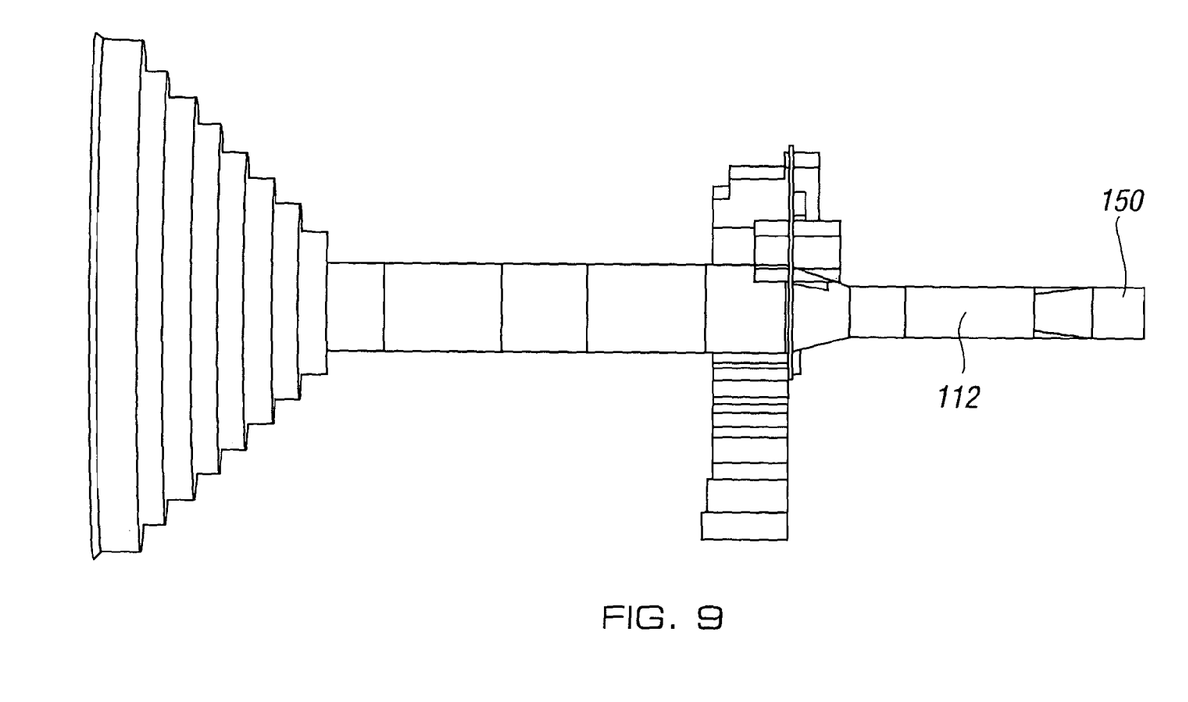

Whilst this is satisfactory in certain locations and in certain formats of signal transmission, at other locations and at different times, it may be required that the alternate circular polarity signals are used and in accordance with the invention, this is achieved by the rotation of section 106 along with the horn 104 by 90 degrees and section 150 by 180 degrees, as illustrated in FIGS. 7 and 8 respectively such that the alternate circular polarity signals are located appropriately with regard to the receiver and/or transmitter and the outlet section for the absorber is located so as to prevent those signals reflecting back into the device and this orientation is shown in FIG. 5. The remainder of the section 112 is fixed for both arrangements as illustrated in FIG. 9.

The current invention therefore provides apparatus which allows the effective and efficient transition of data signals which are received in multiple frequency bands and polarisations into sets and subsets and the transfer of those subsets of data signals to the appropriate processing means.

The invention claimed is:

1. Apparatus for receiving radio frequency data signals transmitted in a plurality of frequency bands, said apparatus including a waveguide which is configured to at least receive some of said data signals, said waveguide includes a passage, said passage having a section which has a reduced cross sectional area compared to an upstream section of the waveguide passage so as to separate data signals received at a lower frequency band into a first set of data signals and data signals received at a higher frequency band into a second set of data signals and routing means are located on, and in communication with, the waveguide passage to allow the routing of said respective sets of data signals to respective processing means wherein the routing means for one of the sets of data signals are provided at a frustoconically shaped reducing portion of the passage whereat said reducing portion has an interior smooth surface which gradually and smoothly joins said section of the passage with the upstream section, said reducing portion located between and joining the said section of the passage with the reduced cross sectional area and the said upstream section of the passage.

2. Apparatus according to claim 1 wherein the apparatus is used to transmit data signals in addition to, or instead of, receiving data signals.

3. Apparatus according to claim 1 wherein the said sets of data signals are separately routed to the processing means.

4. Apparatus according to claim 1 wherein said reducing portion progressively narrows the cross sectional area of the waveguide until the required reduced cross sectional area is achieved.

5. Apparatus according to claim 4 wherein the interior surface of the reducing portion is relatively smooth electrically.

6. Apparatus according to claim 1 wherein only the set of data signals using the higher frequency band passes to the section of the waveguide passage with the reduced cross sectional area.

7. Apparatus according to claim 1 wherein the means for routing the set of data signals received in the higher frequency waveband are located in the section of the waveguide passage with the reduced cross sectional area.

8. Apparatus according to claim 1 wherein means for routing the respective sets of data signals are provided in the form of probes.

9. Apparatus according to claim 8 wherein the probes include microstrips.

10. Apparatus according to claim 8 wherein two probes are provided for each of the sets of data signals.

11. Apparatus according to claim 8 wherein the probes are connected to a common PCB on which data signal processing means are provided to allow the appropriate processing of the sets of data signals which are routed along respective path.

12. Apparatus according to claim 8 wherein the probes are coaxial.

13. Apparatus according to claim 1 wherein the waveguide includes one or more polariser structures.

14. Apparatus according to claim 13 wherein a stepped section is provided and formed to act as a septum polariser to allow the splitting of a set of data signals into two subsets.

15. Apparatus according to claim 13 wherein said apparatus passage includes a first section for receiving and processing signals received at a lower frequency band and a second section for receiving and processing signals at a higher frequency band and said second section is split, at least at the outlet therefrom, to have an outlet for left-hand circular polarity signals and an outlet for right-hand circular polarity signals in a first operating orientation and a receiver and/or transmitter is located at one of said outlets to receive signals therefrom and/or transmit signals thereto, wherein relative movement between the sections allows the selection of which of the outlets the receiver and/or transmitter receives and/or transmits signals from and/or to.

16. Apparatus according to claim 15 wherein the said second section is rotatably adjustable so as to allow the selective positioning of one of the outlets with the said receiver and/or transmitter.

17. Apparatus according to claim 16 wherein the rotation is about the longitudinal axis of the said second section.

18. Apparatus according to claim 17 wherein the rotation of the second section required in order to move the same from a position at which the first outlet is located at the receiver and/or transmitter to a position at which the other outlet is located at the receiver and/or transmitter is 180°.

19. Apparatus according to claim 13 wherein a second polariser is provided at a spaced location along the waveguide from a first polariser.

20. Apparatus according to claim 1 wherein the reducing section is located intermediate a circular waveguide section of the passage with a first cross sectional area to a circular waveguide section of the passage with a second cross sectional area which is less than that of the first circular waveguide section of the passage and connects the two sections.

21. Apparatus according to claim 20 wherein a printed circuit board (PCB) is located in the reducing section.

22. Apparatus according to claim 21 wherein the PCB includes a probe for the reception and/or transmission of a first set of data signals received in a frequency band which is lower than a frequency band, of a second set of data signals.

23. Apparatus according to claim 22 wherein an aperture is provided in the waveguide with respect to the said probe to allow the transmission and/or reception of a subset of the first set of data signals which is orthogonally polarised with respect to the other subset of the first set of data signals.

24. Apparatus according to claim 20 wherein a printed circuit board (PCB) is located in the circular waveguide section with the smaller cross sectional area.

25. Apparatus according to claim 24 wherein the PCB includes a probe for reception/transmission of the second set of data signals.

26. Apparatus according to claim 25 wherein an aperture is pros in the waveguide with respect to the said probe to allow the reception and/or transmission of a subset of the second set of data signals which is orthogonally polarised with respect to the other subset of the second set of data signals.

27. Apparatus according to claim 20 wherein the waveguide is provided with coaxial probes to allow the separate processing of said first and second sets of data signals.

28. Apparatus according to claim 20 including a polariser structure to process the second set of data signals.

29. Apparatus for receiving radio frequency data signals transmitted in a plurality of frequency bands, said apparatus including a waveguide which is configured to at least receive some of said data signals, wherein said waveguide includes a passage with a circular cross section, said passage having a section which has a reduced cross sectional area compared to an upstream section of the passage so as to separate data signals received at a lower frequency band into a first set of data signals and data signals received at a higher frequency band into a second set of data signals and routing means are located on, and in communication with, the passage to allow the routing of said respective sets of data signals to respective processing means wherein the routing means for one of the sets of data signals are provided at a frustoconically shaped reducing portion of the passage, said reducing portion having a smooth interior surface extending and located between, and gradually and smoothly joining, the said section of the passage with the reduced cross sectional area and the said upstream section of the passage, the routing means for the respective sets of data signals are provided in the form of probes which include microstrips and two, probes are provided on a common PCB for the first set of data signals and two probes are provided on a common PCB for the second set of data signals, said PCB's provided with data signal processing means to allow the appropriate processing of the sets of data signals which are routed along respective paths, and one of the PCB's is located in the reducing section of the passage and the other of the PCB's is located in the waveguide section with the smaller cross sectional area.

* * * * *

UNITED STATES PATENT AND TRADEMARK OFFICE
CERTIFICATE OF CORRECTION

| | | |
|---|---|---|
| PATENT NO. | : 9,735,470 B2 | |
| APPLICATION NO. | : 14/379364 | |
| DATED | : August 15, 2017 | |
| INVENTOR(S) | : Matthew James Pike | |

It is certified that error appears in the above-identified patent and that said Letters Patent is hereby corrected as shown below:

In the Claims

In Column 8, Line 11, please change "pros" to --provided--.

In Column 8, Line 41, please delete the ",".

Signed and Sealed this
Tenth Day of October, 2017

Joseph Matal
*Performing the Functions and Duties of the
Under Secretary of Commerce for Intellectual Property and
Director of the United States Patent and Trademark Office*